United States Patent
Liu et al.

(10) Patent No.: US 10,012,860 B2
(45) Date of Patent: Jul. 3, 2018

(54) POLARIZERS AND THE MANUFACTURING METHODS THEREOF, AND LIQUID CRYSTAL PANELS

(71) Applicant: Shenzhen China Star Optoelectronics Technology Co., Ltd., Shenzhen, Guangdong (CN)

(72) Inventors: Dandan Liu, Guangdong (CN); Dejiun Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 245 days.

(21) Appl. No.: 14/770,127

(22) PCT Filed: May 21, 2015

(86) PCT No.: PCT/CN2015/079513
§ 371 (c)(1),
(2) Date: Aug. 25, 2015

(87) PCT Pub. No.: WO2016/173018
PCT Pub. Date: Nov. 3, 2016

(65) Prior Publication Data
US 2017/0139262 A1    May 18, 2017

(30) Foreign Application Priority Data
Apr. 29, 2015 (CN) .......................... 2015 1 0209996

(51) Int. Cl.
G02F 1/1335  (2006.01)
G02B 1/118  (2015.01)
(Continued)

(52) U.S. Cl.
CPC ........ G02F 1/133502 (2013.01); G02B 1/111 (2013.01); G02B 1/118 (2013.01);
(Continued)

(58) Field of Classification Search
None
See application file for complete search history.

(56) References Cited

U.S. PATENT DOCUMENTS

2001/0039313 A1* 11/2001 Ogawa ................ C08G 64/085
525/196
2006/0262397 A1* 11/2006 Lee ...................... G02B 5/3025
359/485.05
(Continued)

FOREIGN PATENT DOCUMENTS

CN          1197929 A     11/1998
CN        104280811 A      1/2005
(Continued)

*Primary Examiner* — James Dudek
(74) *Attorney, Agent, or Firm* — Andrew C. Cheng

(57) ABSTRACT

A polarizer includes a polarizer base and a plurality of protrusive microstructures being arranged on the polarizer base. The microstructure includes at least two layers of curing-light or thermosetting resin materials. The manufacturing method of the curing-light or thermosetting resin materials includes: providing a polarizer base and coating at least two layers of curing-light or thermosetting resin materials on the polarizer base; and arranging a plurality of lighting dots or heating dots on the curing-light or thermosetting resin materials such that the curing-light or thermosetting resin materials shrink and the lighting dots or heating dots are centers of the shrinkage to form a plurality of protrusive microstructures. In addition, a liquid crystal panel includes the above-mentioned polarizer.

10 Claims, 3 Drawing Sheets

(51) Int. Cl.
*G02B 5/30* (2006.01)
*G02B 1/14* (2015.01)
*G02B 1/111* (2015.01)
*G02F 1/1368* (2006.01)

(52) U.S. Cl.
CPC ............. *G02B 1/14* (2015.01); *G02B 5/3033* (2013.01); *G02F 1/133504* (2013.01); *G02F 1/133528* (2013.01); *G02F 1/1368* (2013.01); *G02F 1/133514* (2013.01); *G02F 2001/133507* (2013.01)

(56) References Cited

U.S. PATENT DOCUMENTS

| | | | | |
|---|---|---|---|---|
| 2010/0079868 | A1* | 4/2010 | Asakura | G02B 5/0226 359/586 |
| 2016/0195658 | A1* | 7/2016 | Yamauchi | G02B 5/3025 359/486.01 |

FOREIGN PATENT DOCUMENTS

| | | |
|---|---|---|
| CN | 101611332 A | 12/2009 |
| CN | 103513317 A | 1/2014 |

* cited by examiner

POLARIZERS AND THE MANUFACTURING METHODS THEREOF, AND LIQUID CRYSTAL PANELS

BACKGROUND OF THE INVENTION

1. Field of the Invention

The present disclosure relates to liquid crystal display technology, and more particularly to a polarizer and the manufacturing method thereof, and the liquid crystal panel having the polarizer.

2. Discussion of the Related Art

Liquid crystal devices (LCDs) are thin and flat display devices having a plurality of colorful or black/white pixels. Usually, the LCDs are arranged in front of a light source or a reflective surface. LCDs are characterized by attributes such as low consumptions, high display performance, small volume, and light, and thus are greatly adopted so as to be the main trend of display devices. Currently, thin film transistor (TFT) LCDs is the most popular one.

Usually, the LCD includes a liquid crystal panel and an up polarizer and a down polarizer attached to the surfaces of the liquid crystal panel to form polarized beams, which control whether the light beams may be passed through. The polarizers may include release film, adhesive layer, a first protection layer, a polarized film, a second protection layer, and a surface protection film stacked in turn. Before attaching the polarizers on the liquid crystal panel, the release film is removed from the polarizer so as to attach the adhesive layer to the liquid crystal panel. After the polarizer is attached, the surface protection film is removed.

The transmission rate of the conventional polarizers may be around 42%. It might be difficult to view the LCDs when the ambient lights is very strong due to the reflection effect of the polarizers. One way to solve this issue is to enhance the brightness of the backlight. Nevertheless, this may increases the power consumption of the backlight.

SUMMARY

The polarizer and the liquid crystal panel incorporating the polarizer include an enhanced structure, which may reduce the reflection issue caused by the ambient lights. As such, the brightness of the display devices is enhanced.

In one aspect, a polarizer includes: a polarizer base and a plurality of protrusive microstructures being arranged on the polarizer base, the microstructure comprising at least two layers of curing-light or thermosetting resin materials.

Wherein each layer of the curing-light or thermosetting resin materials is one of PET, PMMA, polycarbonate, and polystyrene.

Wherein the microstructures are substantially bar-shaped, and a plurality of bar-shaped microstructures are arranged on the polarizer base along a transverse or a longitudinal direction of the polarizer base.

Wherein the microstructures are substantially emboss-shaped, and a plurality of emboss-shaped microstructures are arranged on the polarizer base in a matrix.

Wherein a width of the microstructure is in a range between 50 nm and 200 nm, and a gap between the two adjacent microstructures is in a range between 50 nm and 200 nm.

Wherein the polarizer base comprises a first protection film, a polarized film, and a second protection film stacked together, and the microstructures are arranged on the second protection film.

In another aspect, a manufacturing method of polarizers includes: providing a polarizer base and coating at least two layers of curing-light or thermosetting resin materials on the polarizer base; and arranging a plurality of lighting dots or heating dots on the curing-light or thermosetting resin materials such that the curing-light or thermosetting resin materials shrink and the lighting dots or heating dots are centers of the shrinkage to form a plurality of protrusive microstructures.

Wherein a plurality of lighting or heating dots are arranged on the polarizer base along a transverse or a longitudinal direction of the polarizer base to form a lighting line or heating line, and a plurality of lighting lines or heating lines are arranged on the polarizer base, the curing-light or thermosetting resin materials shrink and the lighting lines and the heating lines are centers of the shrinkage to form a plurality of bar-shaped microstructures.

Wherein a plurality of lighting or heating dots are arranged on the curing-light or thermosetting resin materials in a matrix, the curing-light or thermosetting resin materials shrink and the lighting dots or the heating dots are center of the shrinkage to form the protrusive microstructures arranged in a matrix.

In another aspect, a liquid crystal panel includes: a thin film transistor (TFT) substrate, a color-filter (CF) substrate opposite to the TFT substrate, and a liquid crystal layer between the TFT substrate and the CF substrate, the TFT substrate connecting to a first polarizer, and the CF substrate connecting to a second polarizer. At least the second polarizer may be the above-mentioned polarizer.

In view of the above, the structure of the polarizer arranged on the light emitting surface of the liquid crystal panel is enhanced by adding one layer of microstructure. The layer of microstructure reflects and scatters the ambient lights, and thus reflection is reduced and the contrastness is enhanced. As such, the readability of the display devices is also enhanced. In addition, the microstructure layer transforms the reflected backlight and the refraction into diffused reflection. As such, the uniformity of the emitted light beams is enhanced, which results in a better contrastness and resolution in wide-viewing angle.

DETAILED DESCRIPTION OF THE EMBODIMENTS

Figure 1:
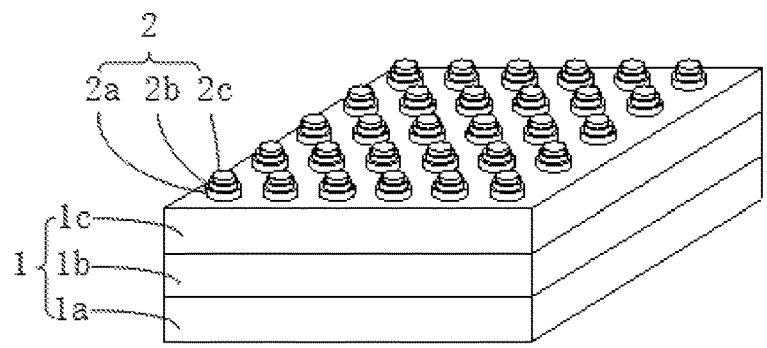
FIG. 1 is a schematic view of the polarizer in accordance with a first embodiment.

Embodiments of the invention will now be described more fully hereinafter with reference to the accompanying drawings, in which embodiments of the invention are shown.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

FIG. 1 is a schematic view of the polarizer in accordance with a first embodiment. As shown in FIG. 1, the polarizer includes a polarizer base 1 and a plurality of protrusive microstructures 2 arranged on the polarizer base 1. Specifically, the polarizer base 1 includes a first protection film 1a, a polarized film 1b, and a second protection film 1c stacked together. The microstructures 2 are arranged on the second protection film 1c. The microstructures 2 are configured to be substantially emboss-shaped, and a plurality of emboss-shaped microstructures 2 are arranged on the polarizer base 1 in a matrix.

The microstructure 2 may include three layers of curing-light or thermosetting resin materials 2a, 2b, and 2c. Each layer of the curing-light or thermosetting resin materials 2a, 2b, and 2c may be one of PET, PMMA, polycarbonate, and polystyrene. In an example, the microstructure 2 may include at least two layers of the curing-light or thermosetting resin materials.

The polarized film 1b is made by Polyvinyl alcohol (PVA). The first protection film 1a and the second protection film 1c are made by Triacetyl Cellulose (TAC). The TAC protection films 1a, 1c are configured for protecting the PVA polarized film 1b. As such, the mechanical performance of the polarized film 1b may be enhanced so as to prevent the PVA polarized film 1b from shrinkage.

Figure 2A:
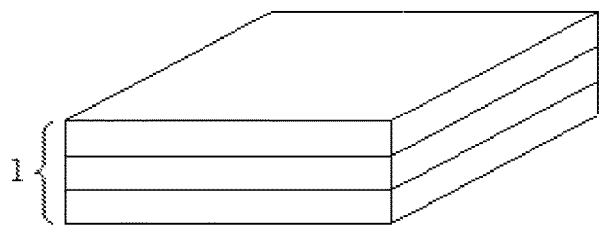
FIGS. 2a-2d are schematic views of the manufacturing method of the polarizer in the first embodiment.
Figure 2B:
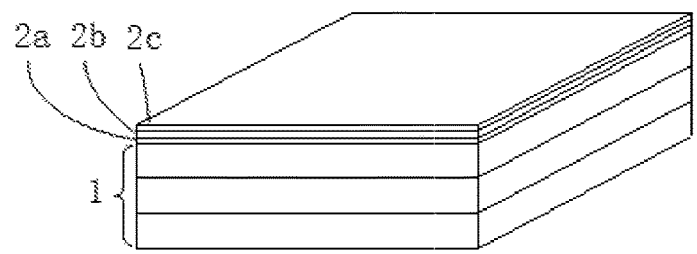

FIGS. 2a-2d are schematic views of the manufacturing method of the polarizer in the first embodiment. In block S11, the polarizer base 1 is provided, as shown in FIG. 2a.

In block S12, the three layers of curing-light or thermosetting resin materials 2a, 2b, and 2c are arranged on the polarizer base 1 in sequence.

Figure 2C:
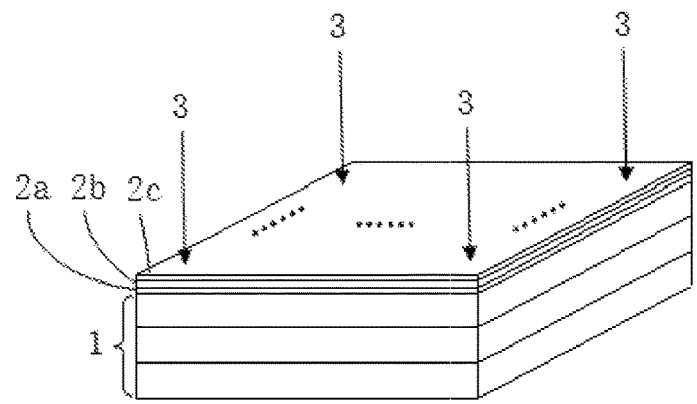
Figure 2D:
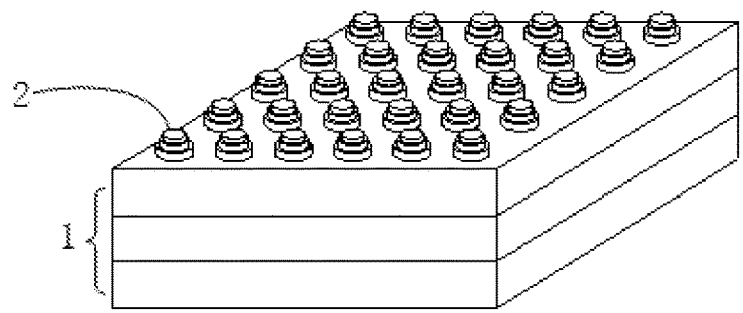

In block S13, a plurality of lighting dots or heating dots 3 are arranged in a matrix for applying lights or heat toward the resin material 2a, 2b, and 2c, as shown in FIG. 2c. Thus, the curing-light or thermosetting resin materials shrink and the lighting dots or heating dots are centers of the shrinkage, which forms the protrusive microstructure 2 formed in the matrix, as shown in FIG. 2d.

The shape of the protrusive microstructure 2 may be determined in accordance with the shrinkage rate of the curing-light or thermosetting resin materials. For instance, when the shrinkage rate of the curing-light or thermosetting resin materials are the same due to the materials are the same, the microstructure 2 may be cylinder-shaped. In the embodiment, the shrinkage rates of the three-layers material have been configured to be gradually increased along an upward direction. Under the circumstance, the dimension of the top of the microstructure 2 is smaller than that of the bottom of the microstructure 2. In addition, the width of the microstructure 2 is in a range between 50 nm and 200 nm, and a gap between the two adjacent microstructure 2 is in a range between 50 nm and 200 nm.

As stated above, one layer of microstructure is added for reflecting and scattering the ambient lights. In this way, reflection is reduced and the contrastness is enhanced, and thus the readability of the display devices is also enhanced.

Figure 3:
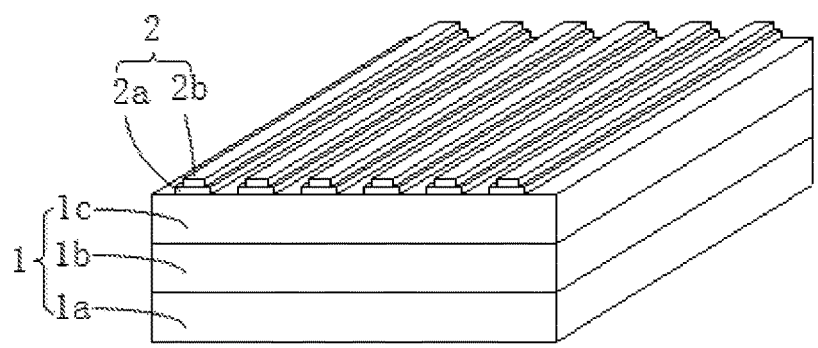
FIG. 3 is a schematic view of the polarizer in accordance with a second embodiment.

FIG. 3 is a schematic view of the polarizer in accordance with a second embodiment.

As shown in FIG. 3, the polarizer includes a polarizer base 1 and a plurality of protrusive microstructures 2 arranged on the polarizer base 1. Specifically, the polarizer base 1 includes a first protection film 1a, a polarized film 1b, and a second protection film 1c. The microstructures 2 are arranged on the second protection film 1c. The microstructures 2 are configured to be substantially bar-shaped, and a plurality of bar-shaped microstructures 2 are arranged on the polarizer base 1 along a transverse or a longitudinal direction of the polarizer base 1.

The microstructure 2 may include two layers of curing-light or thermosetting resin materials 2a and 2b. Each layer of the curing-light or thermosetting resin materials 2a, 2b may be one of PET, PMMA, polycarbonate, and polystyrene. In an example, the microstructure 2 may include at least two layers of the curing-light or thermosetting resin materials.

The polarized film 1b is made by Polyvinyl alcohol (PVA). The first protection film 1a and the second protection film 1c are made by Triacetyl Cellulose (TAC). The TAC protection films 1a, 1c are configured for protecting the PVA polarized film 1b. As such, the mechanical performance of the polarized film 1b may be enhanced so as to prevent the PVA polarized film 1b from shrinkage.

Figure 4A:
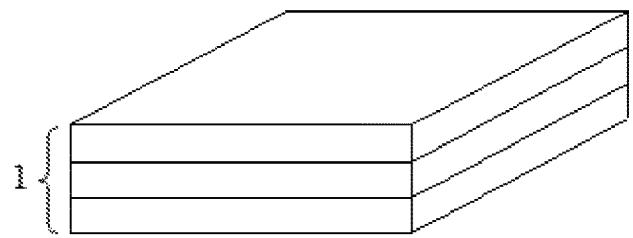
FIGS. 4a-4d are schematic views of the manufacturing method of the polarizer in the second embodiment.

FIGS. 4a-4d are schematic views of the manufacturing method of the polarizer in the second embodiment. In block S21, the polarizer base 1 is provided, as shown in FIG. 4a.

Figure 4B:
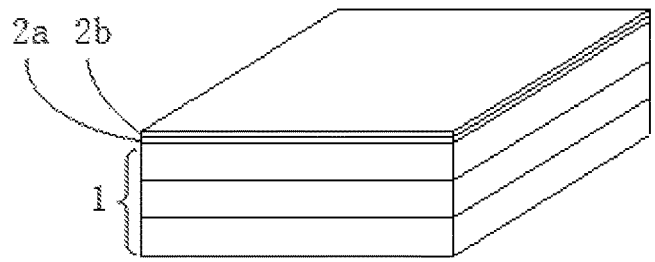

In block S22, the two layers of curing-light or thermosetting resin materials 2a, and 2b are arranged on the polarizer base 1 in sequence, as shown in FIG. 4b.

Figure 4C:
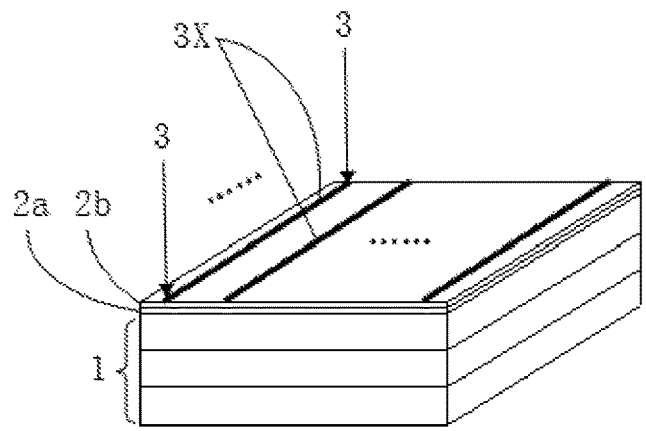

In block S23, a plurality of lighting dots or heating dots 3 are arranged for applying lights or heat toward the resin material 2a and 2b, wherein the lighting dots or heating dots form a lighting line or a heating line (3X) along a first direction. In this example, the first direction is longitudinal. In addition, a plurality of lighting lines or heating lines (3X) are arranged on the polarizer base 1 along a second direction, as shown in FIG. 4c. The curing-light or thermosetting resin materials 2a, 2b shrink and the lighting lines and the heating lines (3X0 are centers of the shrinkage to form a plurality of bar-shaped microstructure 2, as shown in FIG. 4d.

Figure 4D:
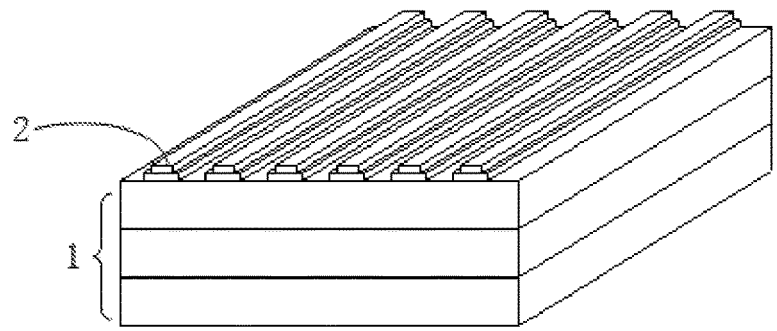

Thus, the curing-light or thermosetting resin materials shrink while the lighting lines or heating lines are centers of the shrinkage, which forms a plurality of bar-shaped microstructures 2, as shown in FIG. 4d.

The shape of the bar-shaped microstructure 2 in a vertical direction may be determined in accordance with the shrinkage rate of the curing-light or thermosetting resin materials. For instance, when the shrinkage rate of the curing-light or thermosetting resin materials are the same due to the materials are the same, the microstructure 2 may be square-shaped. In the embodiment, the shrinkage rates of the lower-layer material have been configured to be smaller than the shrinkage rates of the upper-layer material. Under the circumstance, the dimension of the top of the microstructure 2 is smaller than that of the bottom of the microstructure 2. In addition, the width of the microstructure 2 is in a range between 50 nm and 200 nm, and a gap between the two adjacent microstructures 2 is in a range between 50 nm and 200 nm.

As stated above, one layer of microstructure is added for reflecting and scattering the ambient lights. In this way, reflection is reduced and the contrastness is enhanced, and thus the readability of the display devices is also enhanced.

Figure 5:
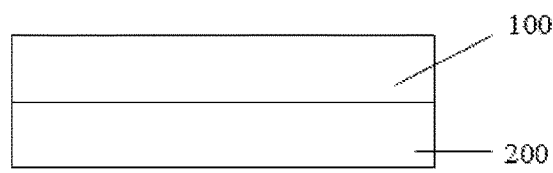
FIG. 5 is a schematic view of the LCD in accordance with a third embodiment.

FIG. 5 is a schematic view of the LCD in accordance with a third embodiment. The LCD includes a liquid crystal panel 100 and a backlight module 200 opposite to the liquid crystal panel 100. The backlight module 200 provides a display light source for the liquid crystal panel 100 such that the liquid crystal panel 100 is capable of displaying images.

Figure 6:
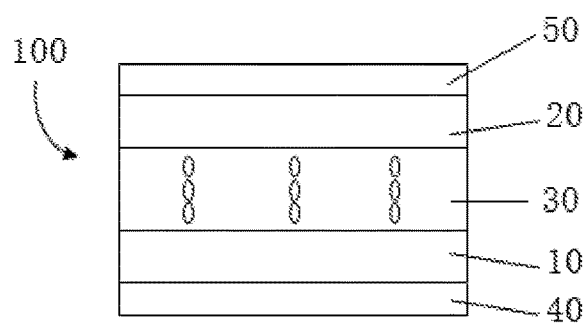
FIG. 6 is a schematic view of the liquid crystal panel in the third embodiment.

As shown in FIG. 6, the liquid crystal panel 100 includes a TFT substrate 10, a color filter (CF) substrate 20 opposite to the TFT substrate 10, and a liquid crystal layer 30 between the TFT substrate 10 and the CF substrate 20. The TFT substrate 10 connects to a first polarizer 40, and the CF substrate 20 connects to a second polarizer 50. The second polarizer 50 is arranged on a light emitting surface of the liquid crystal panel 100, and the second polarizer 50 may be the polarizer in the first or second embodiment.

In an example, the second polarizer 50 may be the polarizer in the first or second embodiment. The microstructure of the polarizer reflects and scatters the ambient lights. In this way, reflection is reduced and the contrastness is enhanced, and thus the readability of the display devices is also enhanced. In addition, the microstructure layer transforms the reflected backlight and the refraction into diffused reflection. As such, the uniformity of the emitted light beams is enhanced, which results in a better contrastness and resolution in wide-viewing angle. The first polarizer 40 arranged on a light incident surface may be a conventional polarizer, or the polarizer in the first or second embodiment. When the first polarizer 40 is the polarizer in the first or the second embodiment, the uniformity of the incident light beams may be enhanced so as to obtain a better display performance.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A polarizer, comprising:
   a polarizer base and a plurality of protrusive microstructures being arranged on the polarizer base, the microstructure comprising at least two layers of curing-light or thermosetting resin materials;
   wherein the polarizer base comprises a first protection film, a polarized film, and a second protection film stacked together, and the microstructures are arranged on the second protection film;
   wherein each layer of the curing-light or thermosetting resin materials is one of PET, PMMA, polycarbonate, and polystyrene; and
   wherein shrinkage rates of the curing-light or thermosetting resin materials of the two layers are configured to be gradually increased along an upward direction.

2. The polarizer as claimed in claim 1, wherein the microstructures are substantially bar-shaped, and a plurality of bar-shaped microstructures are arranged on the polarizer base along a transverse or a longitudinal direction of the polarizer base.

3. The polarizer as claimed in claim 2, wherein a width of the microstructure is in a range between 50 nm and 200 nm, and a gap between the two adjacent microstructures is in a range between 50 nm and 200 nm.

4. The polarizer as claimed in claim 1, wherein the microstructures are substantially emboss-shaped, and a plurality of emboss-shaped microstructures are arranged on the polarizer base in a matrix.

5. The polarizer as claimed in claim 4, wherein a width of the microstructure is in a range between 50 nm and 200 nm, and a gap between the two adjacent microstructures is in a range between 50 nm and 200 nm.

6. A liquid crystal panel, comprising:
   a thin film transistor (TFT) substrate, a color-filter (CF) substrate opposite to the TFT substrate, and a liquid crystal layer between the TFT substrate and the CF substrate, the TFT substrate connecting to a first polarizer, and the CF substrate connecting to a second polarizer, the second polarizer comprising a polarizer base and a plurality of protrusive microstructures being arranged on the polarizer base, and the microstructure comprising at least two layers of curing-light or thermosetting resin materials;
   wherein the polarizer base comprises a first protection film, a polarized film, and a second protection film stacked together, and the microstructures are arranged on the second protection film; wherein each layer of the curing-light or thermosetting resin materials is one of PET, PMMA, polycarbonate, and polystyrene; and
   wherein shrinkage rates of the curing-light or thermosetting resin materials of the two layers are configured to be gradually increased along an upward direction.

7. The liquid crystal panel as claimed in claim 6, wherein the microstructures are substantially bar-shaped, and a plurality of bar-shaped microstructures are arranged on the polarizer base along a transverse or a longitudinal direction of the polarizer base.

8. The liquid crystal panel as claimed in claim 7, wherein a width of the microstructure is in a range between 50 nm and 200 nm, and a gap between the two adjacent microstructures is in a range between 50 nm and 200 nm.

9. The liquid crystal panel as claimed in claim 6, wherein the microstructures are substantially emboss-shaped, and a plurality of emboss-shaped microstructures are arranged on the polarizer base in a matrix.

10. The liquid crystal panel as claimed in claim 9, wherein a width of the microstructure is in a range between 50 nm and 200 nm, and a gap between the two adjacent microstructures is in a range between 50 nm and 200 nm.

* * * * *